(12) United States Patent
Rayaprolu et al.

(10) Patent No.: US 10,963,340 B2
(45) Date of Patent: Mar. 30, 2021

(54) STORING CRITICAL DATA AT A MEMORY SYSTEM

(71) Applicant: Micron Technology, Inc., Boise, ID (US)

(72) Inventors: Vamsi Rayaprolu, San Jose, CA (US); Sivagnanam Parthasarathy, Carlsbad, CA (US); Sampath K. Ratnam, Boise, ID (US); Peter Feeley, Boise, ID (US); Kishore Kumar Muchherla, Fremont, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 153 days.

(21) Appl. No.: 16/029,331

(22) Filed: Jul. 6, 2018

(65) Prior Publication Data

US 2019/0227870 A1 Jul. 25, 2019

Related U.S. Application Data

(60) Provisional application No. 62/621,502, filed on Jan. 24, 2018.

(51) Int. Cl.
*G06F 11/10* (2006.01)
*G06F 11/00* (2006.01)
*G06F 3/06* (2006.01)
*G06F 3/00* (2006.01)

(52) U.S. Cl.
CPC .......... *G06F 11/1076* (2013.01); *G06F 3/064* (2013.01); *G06F 3/0619* (2013.01); *G06F 3/0673* (2013.01); *G06F 11/1004* (2013.01); *G06F 11/1012* (2013.01)

(58) Field of Classification Search
None
See application file for complete search history.

(56) References Cited

U.S. PATENT DOCUMENTS

| | | | |
|---|---|---|---|
| 9,530,512 B2* | 12/2016 | Ray | G11C 16/26 |
| 10,298,259 B1* | 5/2019 | Lazier | H03M 13/05 |
| 10,372,625 B2* | 8/2019 | Branco | G06F 11/1048 |
| 2012/0144270 A1 | 6/2012 | Diggs et al. | |
| 2014/0129901 A1 | 5/2014 | Magaki et al. | |
| 2016/0034354 A1 | 2/2016 | Hashimoto et al. | |
| 2017/0024277 A1 | 1/2017 | Wong | |
| 2017/0277448 A1 | 9/2017 | Khoueir et al. | |

OTHER PUBLICATIONS

International Search Report and Written Opinion for Application No. PCT/US2019/014051 dated May 1, 2019, 12 pages.

* cited by examiner

*Primary Examiner* — Justin R Knapp
(74) *Attorney, Agent, or Firm* — Lowenstein Sandler LLP

(57) ABSTRACT

User data that is to be stored at a memory system can be received. System data associated with the memory system can be identified and the user data and the system data can be stored at the memory system based on an error control operation. A subset of the system data can be identified and the subset of the system data can be stored at the memory system based on another error control operation.

20 Claims, 5 Drawing Sheets

STORING CRITICAL DATA AT A MEMORY SYSTEM

RELATED APPLICATION

This application claims the benefit under 35 U.S.C. § 119(e) of U.S. Provisional Application 62/621,502 filed on Jan. 24, 2018.

TECHNICAL FIELD

The present disclosure generally relates to memory systems, and more specifically, relates to storing critical data at a memory system.

BACKGROUND

A memory system can be a memory system, such as a solid-state drive (SSD), and can include one or more memory devices that store data. A memory system can include memory devices such as non-volatile memory devices and volatile memory devices. In general, a host system can utilize a memory system to store data at the memory devices of the memory system and to retrieve data from the memory devices of the memory system.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
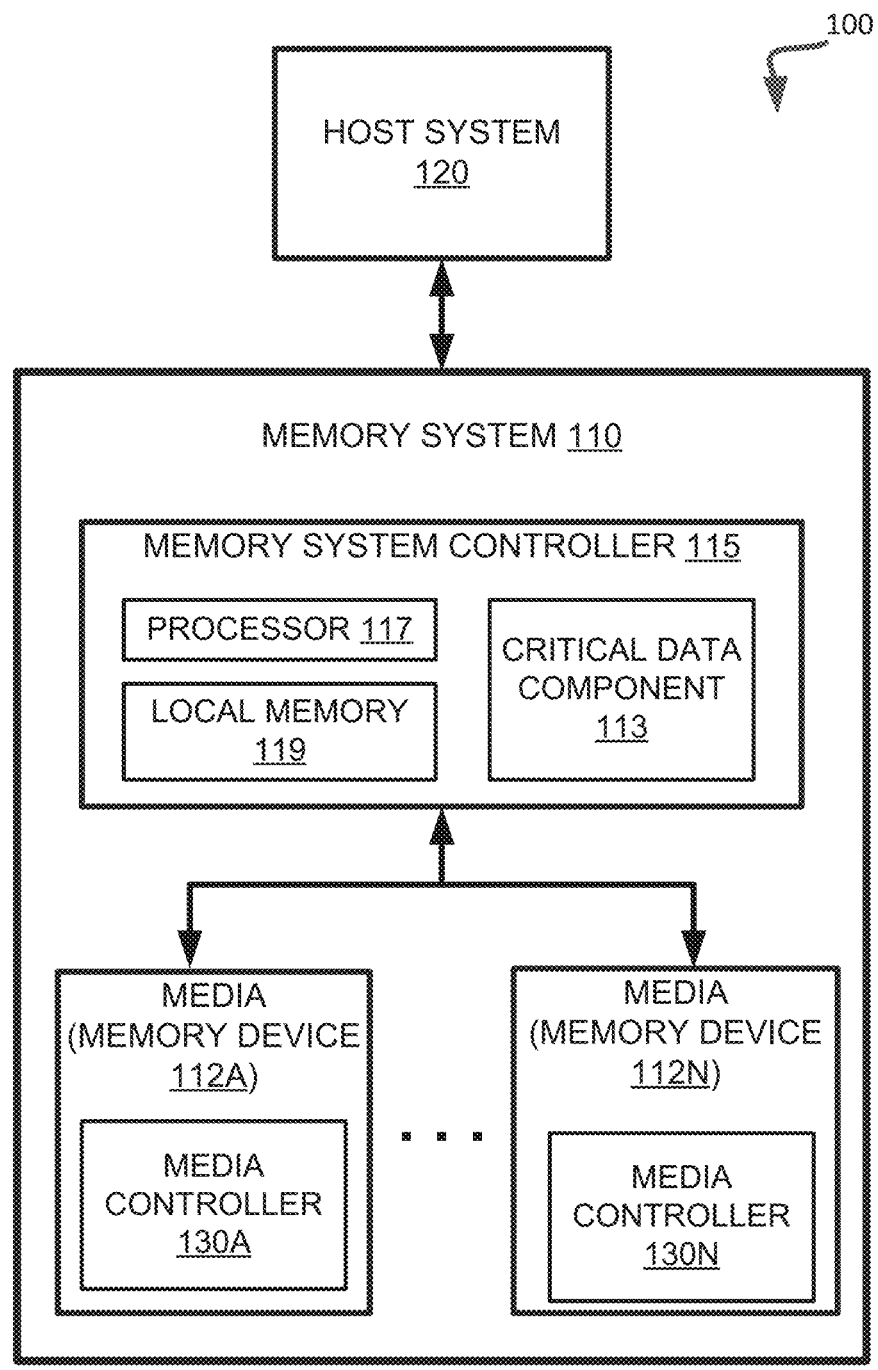
FIG. 1 illustrates an example computing environment that includes a memory system in accordance with some embodiments of the present disclosure.

Aspects of the present disclosure are directed to storing critical data at a memory system. In general, a host system can utilize a memory system that includes one or more memory devices. An example of a memory system is a solid-state drive (SSD) or a hybrid memory/storage system. The host system can provide write requests to store data at the memory system and read requests to retrieve data currently stored at the memory system. As user data is received from the host system and stored at the memory system, the memory system can store additional data with the received user data. Such additional data can be system data that identifies characteristics of the memory system. The system data can identify characteristics of the memory system at a time when the user data is stored at the memory system.

The memory system can implement an error detection and correction (i.e., an error control) operation for the user data and the system data that is stored and retrieved at the memory system. An error control operation can encode the user data and store the encoded user data at the memory system. Subsequently, when the user data is to be read by the memory system and returned to the host system, the error control operation can be performed on the retrieved user data by decoding the encoded user data and detecting any errors that may have been caused by noise or other such impairments that causes a value or bit of the user data to switch (e.g., from a '0' value to a '1' value or vice versa) when the user data is stored at the memory system or read from the memory system. The detected error can subsequently be corrected by using the error control operation.

A read operation to retrieve the user data can be based on a portion of the system data. For example, critical data that is included in the system data can be used by the memory system to determine how to read the corresponding user data that is stored at a memory device of the memory system. As an example, the critical data can specify a temperature value of the memory system when a particular user data was written to a memory device of the memory system. The temperature value can later be used by to determine a particular read voltage level that is to be used when retrieving the corresponding user data at the memory device. For example, after receiving a request for the user data, the encoded system data can be retrieved and the error control operation can be performed on the system data to retrieve the critical data. Subsequently, the memory system can retrieve the user data from a memory device based on the critical data. The use of the critical data to determine how to perform a read operation for the user data can result in fewer errors in the retrieved user data as less errors may be present as a result of the read operation for the user data that is facilitated by using the critical data. Thus, the error control operation can more easily detect and correct potential errors in the user data as fewer errors at the retrieved user data may be detected and corrected.

Conventional memory systems can encode the user data and the system data based on the same type of error control operation. However, if the error control operation is not capable of recovering the system data as a result of the number of errors being present in the retrieved system data exceeding an error correction capability of the error control operation, then the system data that is retrieved may also include more errors. Since the errors in the system data may not be corrected in such a case, the read operation for the user data can also result in an increased number of errors as the read operation cannot be assisted by the critical data that is included in the system data.

Aspects of the present disclosure address the above and other deficiencies by storing the critical data at the memory system based on an additional error control operation. For example, the user data and system data of the memory system can be stored at the memory system by using an initial error control operation. The system data can include the critical data such as the temperature value of the memory system at a time when the user data was stored at the memory system. Another error control operation can be used to store the critical data. The other error control operation can be different than the initial error control operation that was used to store the user data and the system data. For example, the other error control operation can be capable of correcting more errors than the initial error control operation. Thus, an initial error control operation can be used to store the system data and another error control operation can be used to store a subset of the system data (e.g., the critical data) that is used to determine how to perform a read operation of the user data.

In response to a subsequent request from a host system for the user data, the memory system can retrieve the system data that was stored based on the initial error control operation. If the initial error control operation is successful, then the critical data from the system data can be identified and used to perform the read operation for the corresponding user data. The initial error control operation can then be used with respect to the retrieved user data. Otherwise, if the initial error control operation was not successful (i.e., a failure), then the critical data that was stored based on the other error control operation can be retrieved by using the other error control operation. The critical data can then be used to perform the read operation for the corresponding user data that was stored based on the initial error control operation. For example, the memory system can apply a particular read voltage level based on the critical system data to retrieve the user data and then the first error control operation can be used for the retrieved user data.

Advantages of the present disclosure include, but are not limited to, an increased reliability of user data that is stored at the memory system. For example, the additional error control operation can provide an improved error correction capability than the error correction capability of the first error control operation. Thus, storing the critical data based on an additional error control operation can provide additional error correction capability that can be used to provide an improved read operation for the user data. The improved read operation can result in fewer errors so that the initial error control operation can be used less frequently to correct errors in the retrieved user data. Furthermore, the additional error control operation can utilize more time to perform than the initial error control operation. However, since the additional error control operation is utilized when the initial error control operation fails when retrieving the system data, then the use of the additional control operation may also be selectively performed when the system data cannot be reliability recovered.

Additionally, since the critical data can be read before the user data is read, the critical data can be used to identify whether the user data is valid. If the user data is not valid data (e.g., no longer used by the host system), then the memory system can determine to not perform the additional error control operation, resulting in improved performance of the memory system as other read or write operations can be performed instead of the additional error control operation. Furthermore, the user data can be used facilitate a read operation that is performed on the user data to reduce errors in the user data. The reduction in the errors can also result in an improved performance of the memory system as the additional error control operation will be used to correct fewer errors.

FIG. 1 illustrates an example computing environment 100 that includes a memory system 110 in accordance with some implementations of the present disclosure. The memory system 110 can include media, such as memory devices 112A to 112N. The memory devices 112A to 112N can be volatile memory devices, non-volatile memory devices, or a combination of such. In some embodiments, the memory system is a storage system. An example of a storage system is a SSD. In general, the computing environment 100 can include a host system 120 that uses the memory system 110. In some implementations, the host system 120 can write data to the memory system 110 and read data from the memory system 110. In some embodiments, the memory system 110 is a hybrid memory/storage system.

The host system 120 can be a computing device such as a desktop computer, laptop computer, network server, mobile device, or such computing device that includes a memory and a processing device. The host system 120 can include or be coupled to the memory system 110 so that the host system 120 can read data from or write data to the memory system 110. The host system 120 can be coupled to the memory system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory system 110. The host system 120 can further utilize an NVM Express (NVMe) interface to access the memory devices 112A to 112N when the memory system 110 is coupled with the host system 120 by the PCIe interface. The physical host interface can provide an interface for passing control, address, data, and other signals between the memory system 110 and the host system 120.

The memory devices 112A to 112N can include any combination of the different types of non-volatile memory devices and/or volatile memory devices. An example of non-volatile memory devices includes a negative- and (NAND) type flash memory. Each of the memory devices 112A to 112N can include one or more arrays of memory cells such as single level cells (SLCs) or multi-level cells (MLCs) (e.g., triple level cells (TLCs) or quad-level cells (QLCs)). In some implementations, a particular memory device can include both an SLC portion and a MLC portion of memory cells. Each of the memory cells can store bits of data (e.g., data blocks) used by the host system 120. Although non-volatile memory devices such as NAND type flash memory are described, the memory devices 112A to 112N can be based on any other type of memory such as a volatile memory. In some implementations, the memory devices 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative- or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross point non-volatile memory can perform a write in-place operation, where a non-volatile memory cell can be programmed without the non-volatile memory cell being previously erased. Furthermore, the memory cells of the memory devices 112A to 112N can be grouped as memory pages or data blocks that can refer to a unit of the memory device used to store data.

The controller 115 can communicate with the memory devices 112A to 112N to perform operations such as reading data, writing data, or erasing data at the memory devices 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory system 110, including handling communications between the memory system 110 and the host system 120. In some embodiments, the local memory 119 can include memory registers storing memory pointers, fetched data, etc. The local memory 119 can also include read-only memory (ROM) for storing micro-code. While the example memory system 110 in FIG. 1 has been illustrated as including the controller 115, in another embodiment of the present disclosure, a memory system 110 may not include a controller 115, and may instead rely upon external control (e.g., provided by an external host, or by a processor or controller separate from the memory system).

In general, the controller 115 can receive commands or operations from the host system 120 and can convert the commands or operations into instructions or appropriate commands to achieve the desired access to the memory devices 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory devices 112A to 112N. The controller 115 can further include host interface circuitry to communicate with the host system 120 via the physical host interface. The host interface circuitry can convert the commands received from the host system into command instructions to access the memory devices 112A to 112N as well as convert responses associated with the memory devices 112A to 112N into information for the host system 120.

The memory system 110 can include a critical data component 113 that can be used to store critical data at the memory devices 112A to 112N. For example, the critical data component 113 can receive user data from the host system 120 and can store the user data based on an initial error control operation. The critical data component 113 can further identify system data at a time when the user data is stored at the memory system. For example, a temperature of the memory system or a memory device of the memory system when the user data was written to the memory device can be included in the system data. A portion of the system data, such as critical data, can then be identified. The critical data component 113 can then store the critical data based on an additional error control operation. Subsequently, the critical data component 113 can perform the error control operation for the system data and/or the additional error control operation for the critical data when a read request for the user data is received from the host system 120. Further details with regards to the operations of the critical data component 113 are described below.

The memory system 110 can also include additional circuitry or components that are not illustrated. In some implementations, the memory system 110 can include a cache or buffer (e.g., DRAM) and address circuitry (e.g., a row decoder and a column decoder) that can receive an address from the controller 115 and decode the address to access the memory devices 112A to 112N.

Figure 2:
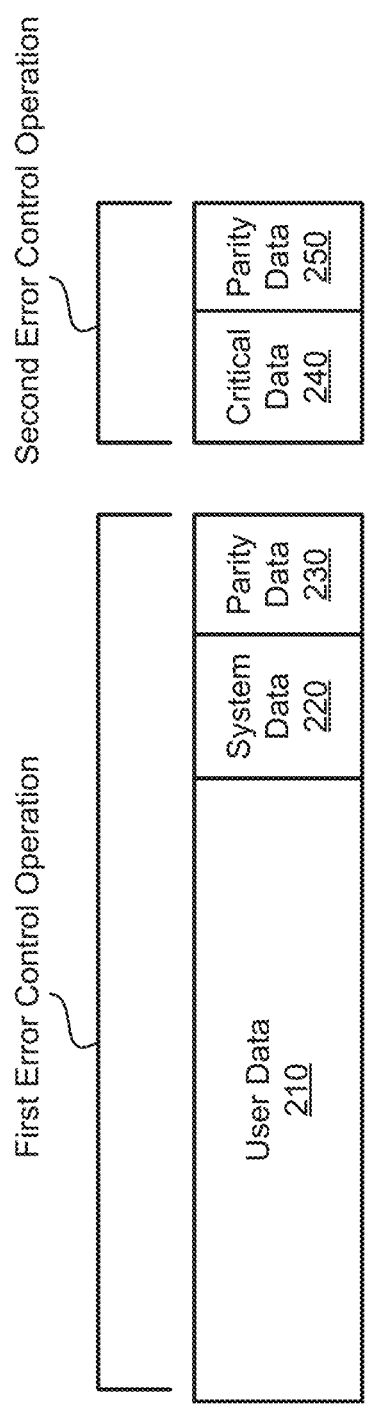
FIG. 2 is a block diagram of data being stored based on error control operations in accordance with some embodiments.

FIG. 2 is a block diagram of data being stored based on error control operations in accordance with some embodiments. The data can be stored or read by the critical data component 113 of FIG. 1.

As shown in FIG. 2, user data 210, system data 220, and parity data 230 can be stored at a memory system based on an initial or first error control operation. An example of the first error control operation includes, but is not limited to, an error-correcting code (ECC) operation such as a low-density parity-check (LDPC) error control operation. The user data 210 can be data that is received from a host system to be stored at a memory device of the memory system. Furthermore, the system data 220 can identify characteristics or conditions of the memory system at a time when the user data 210 has been stored at the memory system. For example, the system data 220 can include, but is not limited to, information identifying a state or operating conditions of the memory system. In some embodiments, the system data includes other such information such as an indication of when particular operations of the memory system have been performed or host system or memory system generated data (e.g., cryptographic keys used with the user data). A portion or subset of the system data 220 can be critical data. Examples of critical data include, but are not limited to, a temperature of the memory system when the user data 210 was stored at the memory system, an indication of the time when the user data 210 was stored at the memory system, a logical block address of the user data 210 and a corresponding physical block address of the memory system that is mapped to the logical block address, or other such characteristics or information related to a status or state of the memory system. In some embodiments, the critical data includes an environmental metric such as pressure or altitude of the memory system when the user data 210 was stored at the memory system, timestamp information indicating when the user data 210 was written or when another operation has been performed by the memory system or host system, host system generated critical data, and additional data used with the user data 210 such as cryptographic keys. The system data 220 can be stored by using the first error control operation. For example, both the user data 210 and the system data 220 can be encoded based on the same first error control operation. Furthermore, the first error control operation used to encode the user data 210 and the system data 220 can be used to generate parity data 230 that is subsequently used by the first error control operation when reading the user data 210 and the system data 220 from the memory system. For example, the parity data 230 can be used to detect and correct errors at the user data 210 and the system data 220.

Furthermore, critical data 240 and corresponding parity data 250 can also be stored at the memory system based on an additional or second error control operation when the user data 210 is stored at the memory system. For example, a different type of error control operation than the type of the initial error control can be used to store the critical data 240 and its corresponding parity data 250. The critical data 240 can be identified from a subset or portion of the system data 220. In some embodiments, the critical data 240 is information used by the memory system to perform a read operation on the user data 210. For example, the critical data 240 can identify the write temperature associated with the user data 210. The write temperature can then be used to determine a read voltage level, or a particular threshold voltage to apply to one or more memory cells storing the user data 210, to perform the read operation of the user data 210. Thus, the critical data 240 can be information from the system data 220 that is used to assist a read operation for the user data 210. The critical data 240 can be encoded based on the second error control operation. An example of the second error control operation includes, but is not limited to, a cyclic redundancy check (CRC) error control operation. Furthermore, the corresponding parity data 250 can be generated based on the second error control operation that is used to encode the critical data 240.

As such, user data 210 and system data 220 can be stored based on a first error control operation. The critical data 240 can be stored based on a second error control operation that is different than the first error control operation. In some embodiments, the first error control operation takes less time to complete than the second error control operation for performing error detection and correction of data at the same size. Furthermore, the second error control operation can be capable of detecting and correcting more errors in data than the first error control operation. In some embodiments, the first error control operation is performed by hardware and the second error control operation is performed by software or firmware. Additionally, the first error control operation can utilize less parity data to more correct errors than the second error control operation. The writing of the user data 210, system data 220, parity data 230, critical data 240, and the corresponding additional parity data 250 at the memory system are described in further detail with regards to FIG. 3. Furthermore, the reading of the user data 210 from the memory system is described in further detail with regards to FIG. 4.

Figure 3:
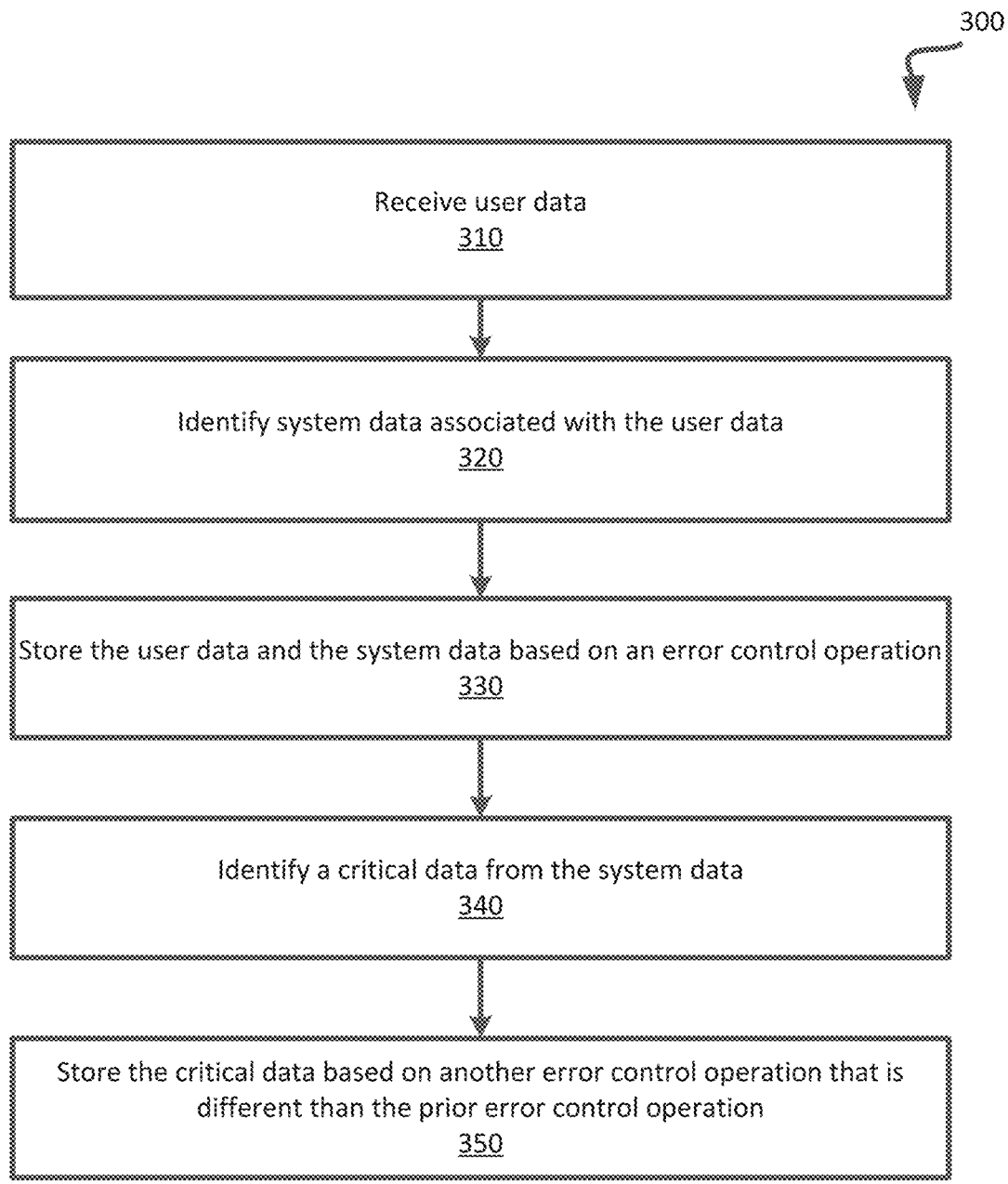
FIG. 3 is a flow diagram of an example method to store user data based on an error control operation and critical data based on another error control operation in accordance with some embodiments of the present disclosure.

FIG. 3 is a flow diagram of an example method 300 to store user data based on an error control operation and critical data based on another error control operation in accordance with some embodiments of the present disclosure. The method 300 can be performed by processing logic includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the critical data component 113 of FIG. 1.

At block 310, processing logic receives user data. For example, the user data can be identified in a write request that is provided by a host system. The processing logic can further identify system data associated with the user data (block 220). For example, the system data can identify one or more characteristics of the memory system at a time when the user data is to be written to the memory system. For example, a temperature of the memory system when the user data is stored at the memory system can be identified. Environmental conditions, logical block address and physical block address information, and other such information as previously described can be identified. The processing logic can subsequently store the user data and the system data based on an error control operation (block 330). For example, the user data and the system data can be encoded by using the error control operation. Furthermore, parity data can be generated for the system data and the user data and the encoded user data, encoded system data, and the parity data can be written at the memory system.

The processing logic can identify a critical data from the system data (block 340). For example, the critical data can be identified from a portion of the system data. The critical data can correspond to information used to facilitate the performance of a read operation of the user data (e.g., a write temperature). The processing logic can store the critical data based on another error control operation that is different than the error control operation used to store the user data and the system data (block 350). The other error control operation can additionally generate corresponding parity data (e.g., additional parity data) for the critical data. The corresponding parity data can be stored at the memory system with the critical data that is encoded based on the other error control operation. In some embodiments, the other error control operation is a CRC error control operation where the ratio between the size of the critical data and the corresponding parity data is used to determine the reliability or error correction capability of the other error control operation. For example, the lower the ratio between the size of the critical data and the size of the corresponding parity data (e.g., the size of the corresponding parity data is closer to the size of the critical data), then the more improved the reliability and error correction capability of the other error control operation than when the ratio is higher. The corresponding parity data for the critical data can be larger in size to provide improved error correction for the critical data. In some embodiments, the ratio of the size of the critical data to the size of its corresponding parity data is lower than the ratio of the size of the user data or system data and the size of the associated parity data.

As such, user data and system data can be stored based on a first error control operation. A subset of the system data (e.g., critical data) can be stored based on a second error control operation that is a different type of error control operation than the first error control operation.

Figure 4:
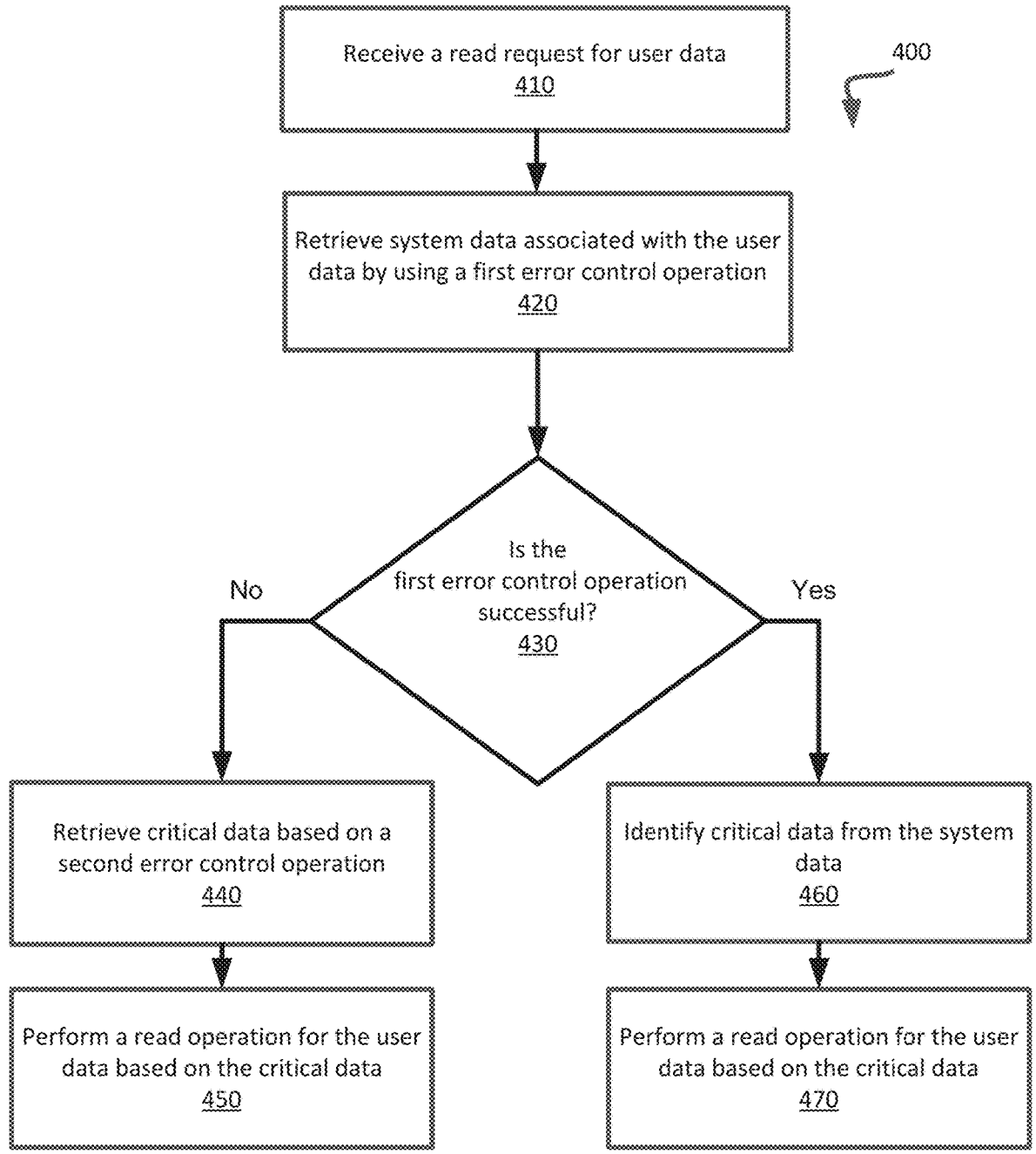
FIG. 4 is a flow diagram of an example method to perform a read operation for user data based on critical data in accordance with some embodiments.

FIG. 4 is a flow diagram of an example method 400 to perform a read operation for user data based on critical data in accordance with some embodiments. The method 400 can be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the critical data component 113 of FIG. 1.

The method 400 can correspond to the reading of user data and critical data after the storing of the user data and critical data as described with regards to method 300 of FIG. 3. As shown in FIG. 4, at block 410, processing logic can receive a read request for user data. For example, the host system can provide a read request for user data that was previously identified in a write request from the host system and subsequently stored at the memory system. The processing logic can retrieve system data associated with the user data by using an initial error control operation (block 420). For example, the encoded system data can be read from the memory system and the initial error control operation can then be used to decode the encoded system data. The processing logic can determine whether the initial error control operation was successful (block 430). For example, the initial error control operation can be considered successful if each detected error of the retrieved and decoded system data has been corrected by the error control operation. If the error control operation was successful, then the processing logic can identify critical data from the system data (block 460). For example, a portion of the system data that corresponds to the critical data can be identified. The processing logic can perform a read operation for the user data based on the critical data (block 470). The read operation can use the critical data to determine how to retrieve the encoded user data that was stored at the memory system. In some embodiments, a read operation parameter can be changed or adjusted based on the critical data. The read operation parameter can be a particular read voltage level that is used in a read operation to retrieve the encoded user data. The adjusted read operation parameter can result in fewer errors being detected at the retrieved user data. Subsequently, the initial error control operation can be used to decode the encoded user data that was read based on the critical data identified from the system data.

Otherwise, if the error control operation was not successful, then the processing logic can retrieve critical data based on an additional error control operation (block 440). For example, the critical data can be encoded and separately stored with the encoded user data. The additional error control operation can then be used to decode the encoded critical data. In some embodiments, the additional error control operation can be used on a result of the first error control operation. For example, the first error control operation can be unsuccessful when a subset, but not all, of the detected errors can be corrected. The additional error control operation can then use the output of the first error control operation with a subset of the corrected errors to correct the remaining errors. Subsequently, the processing logic can perform the read operation for the user data based on the critical data that was retrieved by using the additional error control operation (block 450).

After the read operation is performed for the user data, the initial error control operation that was used to encode the user data can then be used to detect and correct errors for the user data. As such, the initial error control operation can be used to retrieve system data. If the initial error control operation is successful, then critical data from the retrieved system data can be used to calibrate a read operation for the user data and then the initial error control operation can be used with the user data. Otherwise, if the initial error control operation is not successful, then a different error control operation can be used to retrieve critical data and the critical data can then be used to calibrate a read operation for the user data and then the initial error control operation that was used to store the user data can also be to perform error correction and detection of the user data.

In some embodiments, the critical data is used to select another error control operation or is data used to facilitate the initial error control operation when performing the read operation for the user data. For example, an amount of time that has elapsed since the user data was stored at the memory system can be used to select a particular error control operation. In some embodiments, a particular error control operation out of a set of available error control operations can be selected based on the critical data (e.g., the elapsed amount of time). In the same or alternative embodiments, the amount of time that has elapsed may be additional data used by the initial error control operation when retrieving the user data. Thus, the critical data may be used as part of an error control operation or to be used to select an error control operation when performing a read operation for the user data.

As previously described, the critical data can identify a logical block address and a corresponding physical block address of the user data. In such an example, the logical block address or the physical block address may be used to determine whether to perform the read operation for the user data. For example, if the host system has previously indicated that data assigned to the logical block address or the mapped physical block address is no longer valid (e.g., the host system has provided a request to erase the data), then a determination can be made to not perform the read operation for the user data. Otherwise, if there is no indication that the data assigned to the logical block address or the mapped physical block address is not valid, then a determination can be made to perform the read operation for the user data.

Figure 5:
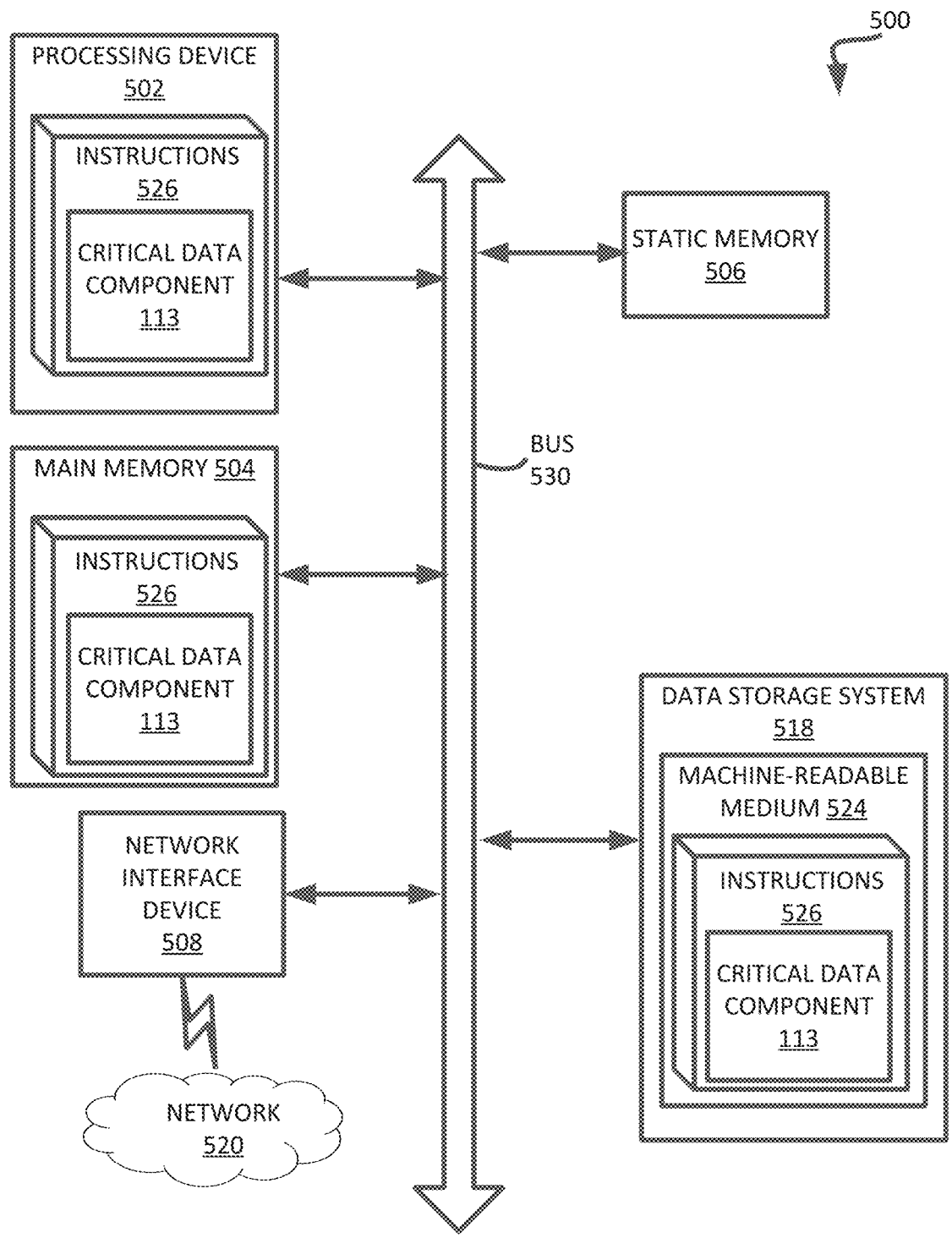
FIG. 5 is a block diagram of an example computer system in which implementations of the present disclosure may operate.

FIG. 5 illustrates an example machine of a computer system 500 within which a set of instructions, for causing the machine to perform any one or more of the methodologies discussed herein, can be executed. In some implementations, the computer system 500 can correspond to a host system (e.g., the host system 120 of FIG. 1) that includes or utilizes a memory system (e.g., the memory system 110 of FIG. 1) or can be used to perform the operations of a controller (e.g., to execute an operating system to perform operations corresponding to the critical data component 113 of FIG. 1). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions or software 526 embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory system 110 of FIG. 1.

In one implementation, the instructions 526 include instructions to implement functionality corresponding to a critical data component (e.g., the critical data component 113 of FIG. 1). While the machine-readable storage medium 524 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving user data to be stored at a memory system;
identifying system data associated with the memory system;
storing the user data and the system data at the memory system based on an error control operation;
identifying a subset of the system data; and
storing, by a processing device, the subset of the system data at the memory system based on another error control operation.

2. The method of claim 1, wherein storing the user data and the system data at the memory system based on the error control operation comprises:
encoding the user data and the system data based on the error control operation;
generating parity data for the user data and the system data based on the error control operation; and
storing the parity data, the encoded user data, and the encoded system data at the memory system.

3. The method of claim 2, wherein storing the subset of the system data at the memory system based on the another error control operation comprises:
encoding the subset of the system data based on the another error control operation;
generating additional parity data associated with the another error control operation; and
storing the additional parity data and the encoded subset of the system data at the memory system, wherein the another error control operation is different than the error control operation.

4. The method of claim 1, wherein identifying the subset of the system data comprises:
identifying information in the system data that is used to perform a read operation of the user data, the subset of the system data being the identified information.

5. The method of claim 1, wherein the subset of the system data corresponds to a write temperature at a time when the user data is stored at the memory system, the write temperature to be used to perform a read operation of the user data.

6. The method of claim 1, wherein the error control operation is based on an error-correcting code (ECC) and the another error control operation is based on a cyclic redundancy check (CRC).

7. The method of claim 1, wherein the subset of the system data stored at the memory system based on the another error control operation is used to perform a read operation with the user data stored at the memory system when the error control operation fails with respect to the system data stored at the memory system.

8. A non-transitory computer readable medium comprising instructions, which when executed by a processing device, cause the processing device to perform comprising:
receiving user data to be stored at a memory system;
identifying system data associated with the memory system;
storing the user data and the system data at the memory system based on an error control operation;
identifying a subset of the system data; and
storing the subset of the system data at the memory system based on another error control operation.

9. The non-transitory computer readable medium of claim 8, wherein to store the user data and the system data at the memory system based on the error control operation, the operations further comprise:
encoding the user data and the system data based on the error control operation;
generating parity data for the user data and the system data based on the error control operation; and
storing the parity data, the encoded user data, and the encoded system data at the memory system.

10. The non-transitory computer readable medium of claim 9, wherein to store the subset of the system data at the memory system based on the another error control operation, the operations further comprise:
encoding the subset of the system data based on the another error control operation;
generating additional parity data associated with the another error control operation; and
storing the additional parity data and the encoded subset of the system data at the memory system, wherein the another error control operation is different than the error control operation.

11. The non-transitory computer readable medium of claim 8, wherein to identify the subset of the system data, the operations further comprise:
identifying information in the system data that is used to perform a read operation of the user data, the subset of the system data being the identified information.

12. The non-transitory computer readable medium of claim 8, wherein the subset of the system data corresponds to a write temperature at a time when the user data is stored at the memory system, the write temperature to be used to perform a read operation of the user data.

13. The non-transitory computer readable medium of claim 8, wherein the error control operation is based on an error-correcting code (ECC) and the another error control operation is based on a cyclic redundancy check (CRC).

14. The non-transitory computer readable medium of claim 8, the subset of the system data stored at the memory system based on the another error control operation is used to perform a read operation with the user data stored at the memory system when the error control operation fails with respect to the system data stored at the memory system.

15. A system comprising:
a memory device; and
a processing device, operatively coupled with the memory device, to perform operations comprising:
receiving user data to be stored at the memory device;
identifying system data associated with the memory device;
storing the user data and the system data at the memory device based on an error control operation;
identifying a subset of the system data; and
storing, by a processing device, the subset of the system data at the memory device based on another error control operation.

16. The system of claim 15, wherein storing the user data and the system data at the memory device based on the error control operation comprises:
encoding the user data and the system data based on the error control operation;
generating parity data for the user data and the system data based on the error control operation; and
storing the parity data, the encoded user data, and the encoded system data at the memory device.

17. The system of claim 15, wherein storing the subset of the system data at the memory device based on the another error control operation comprises:
encoding the subset of the system data based on the another error control operation;
generating additional parity data associated with the another error control operation; and
storing the additional parity data and the encoded subset of the system data at the memory device, wherein the another error control operation is different than the error control operation.

18. The system of claim 15, wherein identifying the subset of the system data comprises:
identifying information in the system data that is used to perform a read operation of the user data, the subset of the system data being the identified information.

19. The system of claim 15, wherein the subset of the system data corresponds to a write temperature at a time when the user data is stored at the memory device, the write temperature to be used to perform a read operation of the user data.

20. The system of claim 15, wherein the error control operation is based on an error-correcting code (ECC) and the another error control operation is based on a cyclic redundancy check (CRC).

* * * * *